United States Patent
Lee et al.

(10) Patent No.: US 7,405,771 B2
(45) Date of Patent: Jul. 29, 2008

(54) METHOD AND DEVICE FOR INDEPENDENT COLOR MANAGEMENT

(75) Inventors: Wei-Kuo Lee, Chupei (TW); Yi-Fan Chen, Taichung (TW); Her-Ming Jong, Hsinchu (TW)

(73) Assignee: Mstar Semiconductor Inc., Hsinchu (TW)

( * ) Notice: Subject to any disclaimer, the term of this patent is extended or adjusted under 35 U.S.C. 154(b) by 766 days.

(21) Appl. No.: 10/965,889

(22) Filed: Oct. 18, 2004

(65) Prior Publication Data

US 2006/0082686 A1   Apr. 20, 2006

(51) Int. Cl.
*H04N 9/68* (2006.01)
*H04N 5/52* (2006.01)

(52) U.S. Cl. .................. 348/645; 348/679; 348/649

(58) Field of Classification Search ......... 348/645–647, 348/649, 654, 679; 382/162, 128; *H04N 9/68, H04N 9/64, 5/52*

See application file for complete search history.

(56) References Cited

U.S. PATENT DOCUMENTS 7,215,366 B2 *  5/2007  Mori et al. .................. 348/649
7,324,674 B2 *  1/2008  Ozawa et al. ............... 382/128

\* cited by examiner

*Primary Examiner*—Sherrie Hsia
(74) *Attorney, Agent, or Firm*—WPAT., P.C.; Justin King

(57) ABSTRACT

The present invention discloses a method and a device for independent color management by using a look-up table (LUT) so as to adjust the color saturation of a single color independently. The method comprises steps of: receiving a color signal of an input pixel; determining color flags and initial saturation values from the color signal by using a look-up table (LUT); obtaining user-controlled color gains according to the color flags; multiplying each of the initial saturation values with one of the corresponding user controlled color gains so as to output an adjusted saturation value; determining a final gain from each the adjusted saturation value by bilinear interpolation according lower-bits of the color signal; and obtaining a new color signal according to the final gain and the color signal. The device comprises a look-up table circuit, defining color flags and initial saturation values as a plurality of points on a coordinate system and receiving a color signal as to output a plurality of signals; a gain output device, receiving the color flags, the initial saturation values and user controlled color gains as to output adjusted saturation gain signals according to the initial saturation values and the user controlled color gains; and an operation unit, receiving the color signal, the initial gain signals as to adjust the color signal according to lower bits of the color signal and the adjusted saturation gain signals.

7 Claims, 3 Drawing Sheets

METHOD AND DEVICE FOR INDEPENDENT COLOR MANAGEMENT

FIELD OF THE INVENTION

The present invention generally relates to a method and a device for independent color management and, more particularly, to a method and a device for independent color management by using a look-up table (LUT) so as to adjust color saturation.

BACKGROUND OF THE INVENTION

For digital color images, the image quality depends on whether the color images are colorfully vivid. The color saturation is an important parameter on determining the vividness of the color images. Therefore, adjusting the color saturation has become a key technique as to improve the image quality of digital color images.

A conventional method to adjust the color saturation for color pixels composed of R, G, B signals, for example, is to convert the R, G, B signals into Y (for luminance) and C (for color (or hue)) signals at first and then adjust the C signals. More particularly, C signals can also be known as different terms for different systems. For example, C signals can be IQ signals for NTSC (National Television Standards Committee) and UV signals for PAL (Phase Alternate Line). Moreover, C signals can be further divided into $C_b$ and $C_r$ signals.

Even though, in the prior art method, C signals are adjusted by adjusting $C_b$ and $C_r$ signals, this simple approach leads to other problems such as $C_b$ and $C_r$ being adjusted simultaneously. As a result, the color saturation for digital color images is re-adjusted while $C_b$ and $C_r$ are adjusted. Therefore, when the color saturation for one color of the digital color image is adjusted, the color saturations for other colors will be affected, thus degrading the image quality.

Accordingly, color aberration occurs in digital color images due to $C_b$ and $C_r$ being adjusted in the prior art method for color saturation adjustment.

In addition to color aberration, low color contrast occurs when the color saturations for all colors are adjusted simultaneously.

Therefore, there is need in providing a method and a device for independent color management making it feasible to adjust the color saturation of a single color independently so as to improve the image quality of digital color images.

SUMMARY OF THE INVENTION

Accordingly, it is the primary object of the present invention to provide a method and a device for independent color management such that the color saturation of a single color can be adjusted independently.

In order to achieve the foregoing object, the present invention provides a method for independent color management, comprising steps of:

receiving a color signal of an input pixel;

determining color flags and initial saturation values from said color signal by using a look-up table (LUT);

obtaining user-controlled color gains according to said color flags;

multiplying each of said initial saturation values with one of said corresponding user controlled color gains so as to output an adjusted saturation value;

determining a final gain from each said adjusted saturation value by bilinear interpolation according lower-bits of said color signal; and obtaining a new color signal according to said final gain and said color signal.

In one preferred embodiment, said color signal is a pair of (Cb, Cr) values or (U, V) values.

In one preferred embodiment, said new color signal is a new pair of (Cb, Cr) values or (U, V) values.

The present invention further provides a device for independent color management, comprising:

a look-up table circuit, defining color flags and initial saturation values as a plurality of points on a coordinate system and receiving a color signal as to output a plurality of signals;

a gain output device, receiving said color flags, said initial saturation values and user controlled color gains as to output adjusted saturation gain signals according to said initial saturation values and said user controlled color gains;

an operation unit, receiving said color signal, said initial gain signals as to adjust said color signal according to lower bits of said color signal and said adjusted saturation gain signals.

In one preferred embodiment, the gain output device further comprises a user controlled gain multiplexer and a plurality of multipliers. The controlled gain multiplexer receives the user determined color gains and color flags as to output a plurality of corresponding final user determined color gains of the input pixel data. The number of multipliers corresponds to the number of color signals. The multipliers receive in a one-on-one fashion the final user-defined color saturation gain and corresponding initial saturation values as to output the adjusted saturation gain signals of this input pixel.

The operation unit further comprises a bi-linear interpolation device and two multipliers. The bi-linear interpolation device receives the adjusted saturation gain signals and the lower bits of color signals as to output a final gain signal. The multipliers receive the color signals and the final gain signal as to output adjusted color signals.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms. Like numerals refer to like parts throughout the disclosure.

BRIEF DESCRIPTION OF THE DRAWINGS

The objects, spirits and advantages of the preferred embodiment of the present invention will be readily understood by the accompanying drawings and detailed descriptions, wherein.

DETAILED DESCRIPTION OF THE INVENTION

The present invention providing a method and a device for independent color management can be exemplified by the preferred embodiment as described hereinafter.

Figure 1:
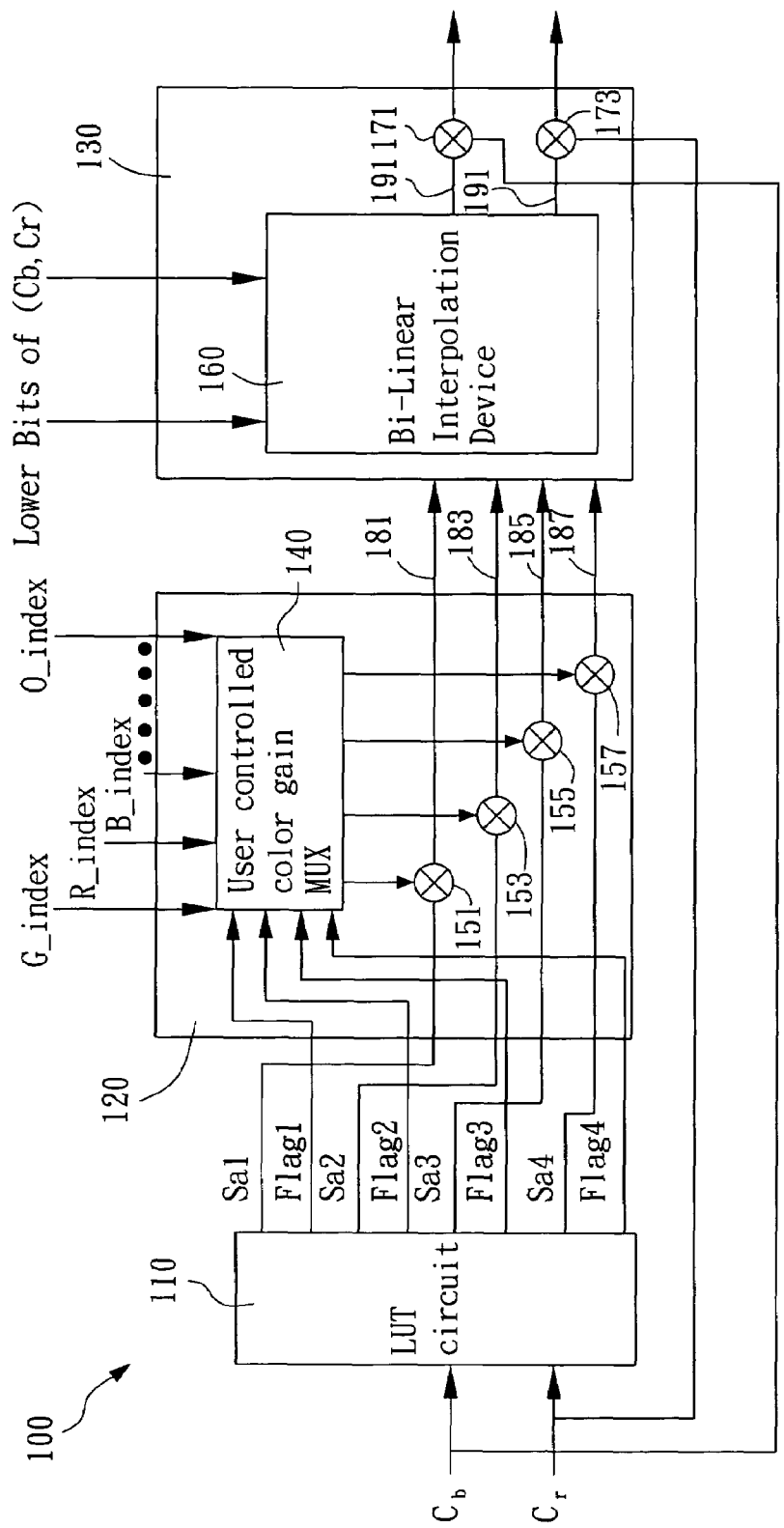
FIG. 1 is a schematic circuit diagram showing a device for independent color management in accordance with the preferred embodiment of the present invention.

Please refer to FIG. 1, which is a schematic circuit diagram showing a device for independent color management in accordance with the preferred embodiment of the present invention. In the figure, the device for independent color management 100 comprises a look-up table (LUT) circuit 110, a gain output device 120 and an operation unit 130. The gain output device 120 comprises a controlled gain MUX 140 and a plurality of multipliers 151~157. The operation unit 130 includes a bi-linear interpolation device 160 and two multipliers 171 and 173.

Figure 2:
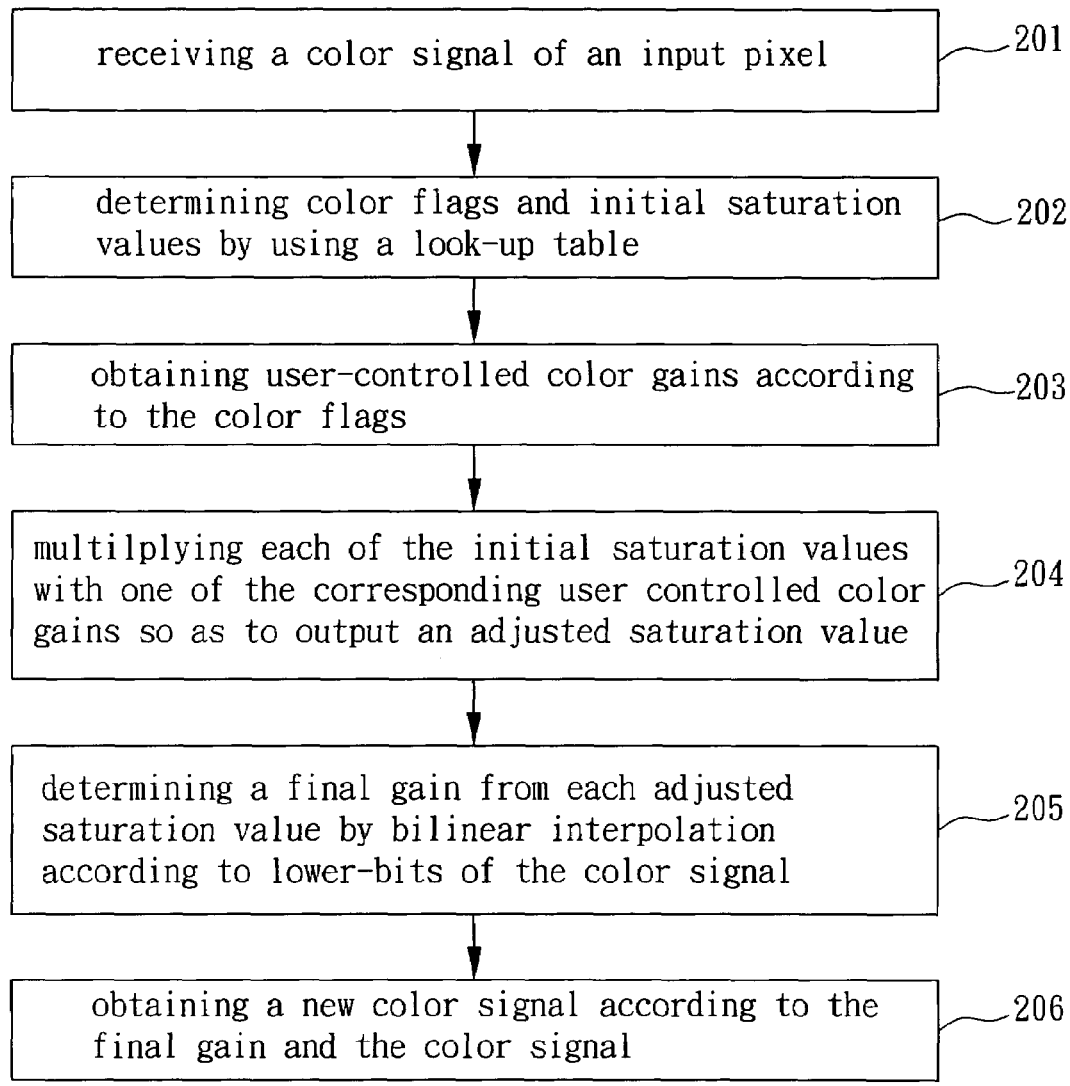
FIG. 2 is a flow chart showing a method for independent color management in accordance with the preferred embodiment of the present invention.

Please refer to FIG. 2, which is a flow chart showing a method for independent color management in accordance with the preferred embodiment of the present invention. To begin with, related parameters for different colors corresponding to color signals $C_b$ and $C_r$ to be adjusted are obtained using the LUT circuit 110 as described in Step 201 in FIG. 2. These parameters can be presented as points on a two-dimensional coordinate system with values. More particular, the relation between the color signals $C_b$ and $C_r$ and the parameters can be user-defined. This 2D LUT could also be defined in the U-V color space.

In the preferred embodiment of the present invention, saturation signals Sa1, Sa2, Sa3 and Sa4 and corresponding flag signals Flag 1~4 are obtained by the LUT circuit 110 after receiving the input color signals ($C_b$ and $C_r$) or (U and V).

The user controlled gain MUX 140 of the gain output device 120 receives the flag signals Flag 1~4 output from the LUT circuit 110 and determined signals R_index (red) ~O_index (other color components) from external connections, while multipliers 151~157 receive signals Sa1~Sa4, respectively. The controlled gain MUX 140 receives the determined signals R_index~O_index (user-defined) and the flag signals Flag 1~4 as to output a plurality of user-defined color saturation gain (Gain_Flag 1~4) corresponding to the initial saturation signals Sa1, Sa2, Sa3 and Sa4. Therefore, the multipliers 151~157 receive, in a one-on-one fashion, the saturation signals Sa1~Sa4 and the corresponding final user-defined color saturation gain signals Gain_Flag 1~4 as to adjust the saturation signals Sa1', Sa2', Sa3' and Sa4', as described in Step 202.

The adjusted saturation signals Sa1', Sa2', Sa3' and Sa4' (i.e., adjusted saturation gain signals 181~187) output from the multipliers 151~157 are performed operation by the bi-linear interpolation device 160 of the operation unit 130 as to output a final gain signal 191 for the color signals ($C_b$ and $C_r$) or (U and V).

Figure 3:
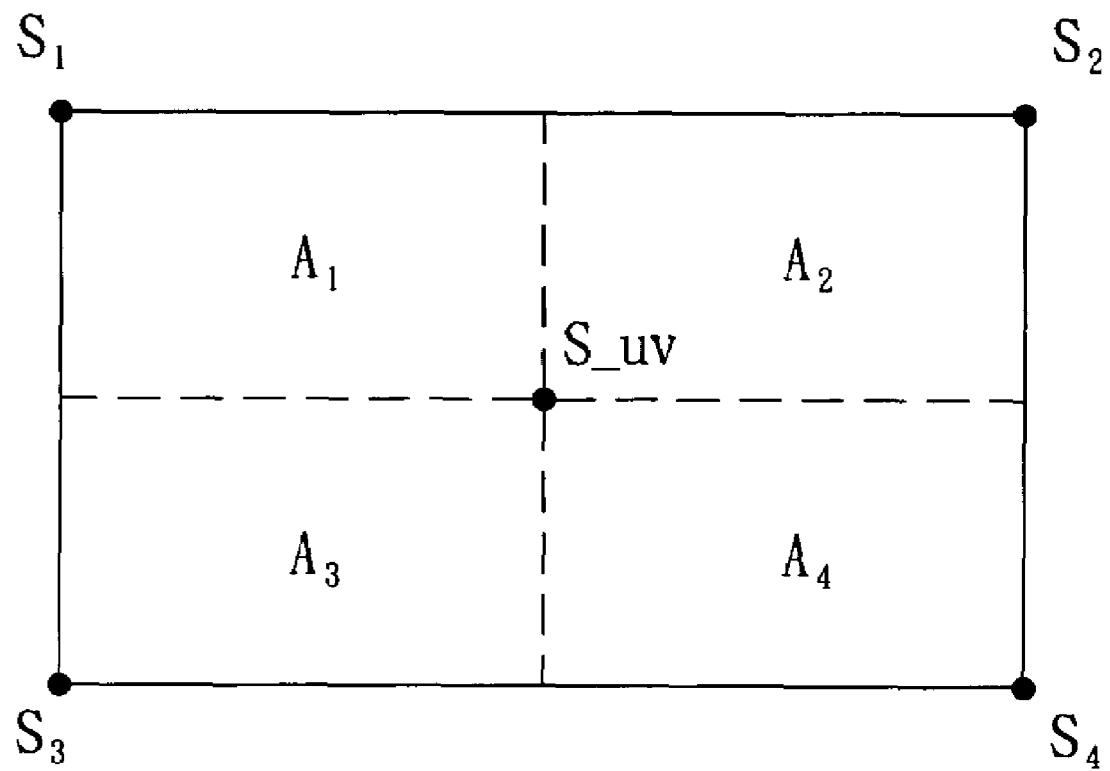
FIG. 3 is a graph showing bi-linear interpolation operation in accordance with the preferred embodiment of the present invention.

FIG. 3 is a graph showing bi-linear interpolation operation in accordance with the preferred embodiment of the present invention. The final gain S_uv is expressed as $$S=(S1\times A4+S2\times A3+S3\times A2+S4\times A1)/(A1+A2+A3+A4)$$

where S1, S2, S3 and S4 denote the values corresponding to the adjusted saturation signals Sa1', Sa2', Sa3' and Sa4' and A1, A2, A3 and A4 are determined from the lower bits of the input color signals ($C_b$, $C_r$).

Therefore, in Step 303, the multipliers 171 and 173 of the operation unit 130 receive the color signals $C_b$ and $C_r$ and the final gain signal 191 as to adjust the gain of the color signals $C_b$ and $C_r$.

As a result, the problem in that color aberration and low color contrast occur in the prior art is overcome by the present invention characterized in that the color saturation of a single color of digital color images can be adjusted independently, thus avoiding problems due to the color saturations for different colors being interfered.

According to the above discussion, the present invention discloses a method and a device for independent color management making it feasible to adjust the color saturation of a single color independently so as to improve the image quality of digital color images. Therefore, the present invention has been examined to be progressive, advantageous and applicable to the industry.

Although this invention has been disclosed and illustrated with reference to particular embodiment, the principles involved are susceptible for use in numerous other embodiments that will be apparent to persons skilled in the art. This invention is, therefore, to be limited only as indicated by the scope of the appended claims.

What is claimed is:

1. A method for independent color management, comprising steps of:
   receiving a color signal of an input pixel;
   determining color flags and initial saturation values from said color signal by using a look-up table (LUT);
   obtaining user-controlled color gains according to said color flags;
   multiplying each of said initial saturation values with one of said corresponding user controlled color gains so as to output an adjusted saturation value;
   determining a final gain from each said adjusted saturation value by bilinear interpolation according to lower-bits of said color signal; and
   obtaining a new color signal according to said final gain and said color signal.

2. The method for independent color management as recited in claim 1, wherein said final gain S is expressed as $$S=(S1\times A4+S2\times A3+S3\times A2+S4\times A1)/(A1+A2+A3+A4)$$

where S1, S2, S3 and S4 denote said values corresponding to said initial saturation values and A1, A2, A3 and A4 are determined from said lower bits of said color signal.

3. The method for independent color management as recited in claim 1, wherein said color signal is a pair of (Cb, Cr) values or (U, V) values.

4. The method for independent color management as recited in claim 1, wherein said new color signal is a new pair of (Cb, Cr) values or (U, V) values.

5. A device for independent color management, comprising:
   a look-up table circuit, defining color flags and initial saturation values as a plurality of points on a coordinate system and receiving a color signal so as to output a plurality of signals;
   a gain output device, receiving said color flags, said initial saturation values and user controlled color gains so as to output adjusted saturation gain signals according to said initial saturation values and said user controlled color gains; and
   an operation unit, receiving said color signal, said adjusted saturation gain signals so as to adjust said color signal according to lower bits of said color signal and said adjusted saturation gain signals.

6. The device for independent color management as recited in claim 5, wherein said gain output device further comprises:
   a controlled gain multiplexer, receiving said user controlled color gains and said color flags so as to output a plurality of corresponding color gains corresponding to a plurality of saturation signals; and a plurality of multipliers, the number of said multipliers corresponding to the number of said color signals, wherein said multipliers receive in a one-on-one fashion said saturation signals and said corresponding color gains so as to output said adjusted saturation gain signals.

7. The device for independent color management as recited in claim 5, wherein said operation unit further comprises:

a bi-linear interpolation device, receiving said adjusted saturation gain signals and said the lower bits of said color signal so as to output a final gain signal; and two multipliers, receiving said color signal and said final gain signal so as to output said adjusted color signal.

* * * * *